United States Patent [19]

Ven Erden

[11] Patent Number: 4,878,987

[45] Date of Patent: Nov. 7, 1989

[54] TRANSVERSE ZIPPER BAG MATERIAL AND METHOD OF AND MEANS FOR MAKING SAME

[75] Inventor: Donald L. Ven Erden, Wildwood, Ill.

[73] Assignee: Minigrip, Inc., Orangeburg, N.Y.

[21] Appl. No.: 226,544

[22] Filed: Aug. 1, 1988

Related U.S. Application Data

[63] Continuation of Ser. No. 26,011, Mar. 16, 1987, abandoned.

[51] Int. Cl.[4] ........................ B31B 1/90; B31B 23/72; B32B 31/10

[52] U.S. Cl. ........................ 156/519; 156/66; 493/213; 493/380

[58] Field of Search ............... 493/193, 212, 213, 214, 493/215, 380; 156/66, 519

[56] References Cited

U.S. PATENT DOCUMENTS

| | | | |
|---|---|---|---|
| 4,328,062 | 5/1982 | Off et al. | 156/353 |
| 4,355,494 | 10/1982 | Tilman | 53/416 |
| 4,617,683 | 10/1986 | Christoff | 383/63 |
| 4,709,398 | 11/1987 | Ausnit | 383/63 |
| 4,735,674 | 4/1988 | Pace | 156/517 |
| 4,736,450 | 4/1988 | Van Erden et al. | 383/65 |
| 4,744,856 | 5/1988 | Williams | 156/519 |

*Primary Examiner*—Frederick R. Schmidt
*Assistant Examiner*—William E. Terrell
*Attorney, Agent, or Firm*—Hill, Van Santen, Steadman & Simpson

[57] ABSTRACT

A method and apparatus for forming film capable of being converted into bags in an form, fill and seal machine or for providing bags attached to each other in end-to-end relationship including relatively advancing a continuous sheet of thin plastic film along a path having a fastener station therealong, moving first and second thermoplastic flexible fastener members laterally from opposite sides of the sheet to extend transversely substantially to the center thereof and attaching said fastener members to the surface of the sheet whereby the sheet can thereafter be formed into bags in an form, fill and seal machine or folded longitudinally to join the fastener members and to form a side seal to form a completed series of bags by cross-seaming the material at predetermined spaced intervals.

4 Claims, 3 Drawing Sheets

TRANSVERSE ZIPPER BAG MATERIAL AND METHOD OF AND MEANS FOR MAKING SAME

This is a continuation of application Ser. No. 026,011 filed Mar. 16, 1987, abandoned.

BACKGROUND OF THE INVENTION

The present invention relates to improvements in mechanisms and methods for the manufacture of reclosable plastic bags and more particularly to an improved arrangement wherein a continuous sheet of film is prepared by attaching fastener elements to the surface thereof.

In the manufacture of plastic bags, various approaches have been used, some where the fastener profiles are integral with extruded thin plastic film material and others wherein the plastic profile strips are attached to the surface of the film. In most arrangements, the bags essentially are formed in side-to-side relationship with the fastener profiles extending parallel to the continuous strip of material. When this type of material is converted into bags on certain form, fill and seal machines, the fasteners will end on the wrong part of the bag, i.e., along the side instead of across the top. In order to provide a bag made in such an form, fill and seal machine, with the fastener across the top, it is necessary to position said fastener across the machine direction of the film.

Other procedures less frequently used have provided bags in end-to-end relationship whereby the continuous material can be rolled on a roll with the material of uniform thickness in the axial direction of the roll.

An object of the present invention is to provide an improved method and apparatus for the manufacture of material from which plastic bags are to be made employing a unique arrangement for the attachment of the fastener members with the members extending laterally across a continuous supply of bag material to provide material suitable for use in a form, fill and seal operation.

A further object of the invention is to provide an arrangement wherein separate and different coacting fastener strips can be attached to a continuous strip of material preparatory to forming reclosable bags from the material such as in a form, fill and seal operation.

A further object of the invention is to provide an improved apparatus and method wherein an improved bag material can be formed from which bags having reclosable tops can be made utilizing continuous rib and groove fastener members which extend laterally across the supply of bag material.

A feature of the invention is the provision of an arrangement whereby a continuous supply of thin thermoplastic film is advanced along a path and separate mating fastener elements are brought in laterally over the top surface of the film simultaneously from opposite directions to almost the film center and then attached to the surface of the film. The fastener strips are supplied off of rolls and cut to the desired length as they are fed onto the film. With this arrangement, the length of the fastener strips can be accurately controlled and their location on the film can be accurately controlled so that they will mate properly when the film is folded.

Other objects, advantages and features will become more apparent with the teaching of the principles of the invention in connection with the disclosure of the preferred embodiments thereof in the claims, and drawings in which:

DESCRIPTION OF THE PREFERRED EMBODIMENTS

Figures 1, 2:
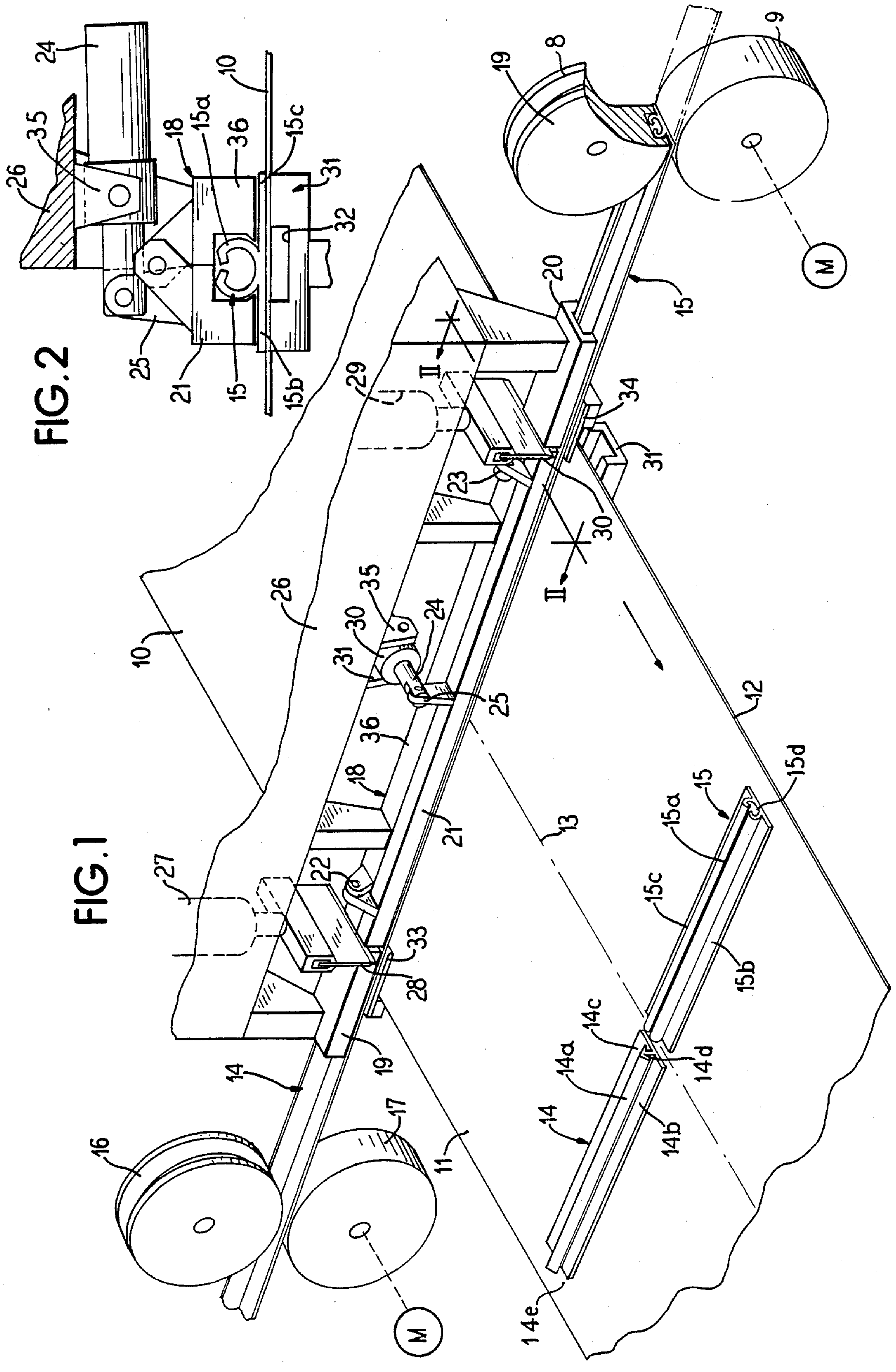
FIG. 1 is a fragmentary perspective view illustrating mechanism for forming film with fasteners in accordance with the principles of the present invention.
FIG. 2 is a vertical sectional view taken substantially along line II—II of FIG. 1.
Figure 3:
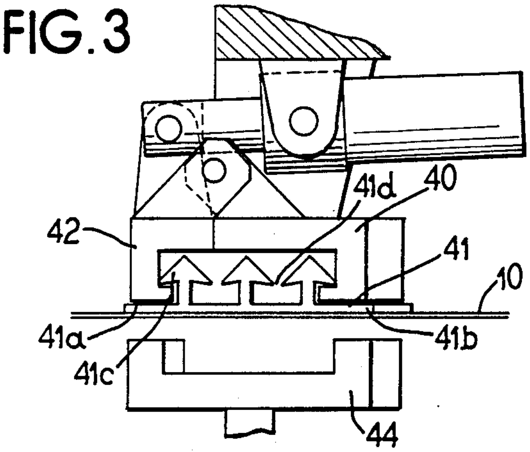
FIG. 3 is a vertical sectional view similar to FIG. 2 but illustrating another form of fastener used in the practice of the invention.

As illustrated in FIGS. 1 and 2, a continuous sheet of thin plastic film adapted for eventually providing a bag body is fed forwardly intermittently from a roll, not shown, by a means, not shown, applying a controlled intermittent forward drawing force. For example, the material may be wound on a roll and the roll driven in rotation intermittently to pull the material 10 forwardly.

The material has lateral side edges 11 and 12 and the longitudinal center is indicated by the broken line 13.

In accordance with the principles of the invention, flexible rib and groove fastener elements 14 and 15 are applied to the surface of the film. In the form shown in FIG. 1, the member 14 is a rib member and the member 15 is a groove member, with 14 and 15 being complementary shaped so that when pressed together, they will interlock. The member 14 has a central rib **14*a* and side flanges 14*b* and 14*c*** to accommodate attachment to the surface of the film.

The strip 15 has a center groove **15*a* with lateral flanges 15*b* and 15*c* for attachment to the surface of the strip. The rib and groove strips 14 and 15 are preferably formed of a thin thermoplastic so that they can be heat sealed to the surface but other forms of attachment such as by adhesive may be employed. Under other circumstances, attachment by heat or impulse seal need be made only at the base area, directly under the grooves strip 15*a* or rib 14*a***, can be by means of a reactivatable adhesive on the fastener base.

For the benefit of continuous operation, the film is moved forwardly incrementally and stopped so that the fastener strips 14 and 15 can be fed laterally across the material at a fastener attachment station shown wherein a supporting frame 2 is located. The fastener strip 14 is fed laterally from the left, as shown in FIG. 1, by a pair of friction rolls 16 and 17 which are suitably driven to advance the material axially in a lateral direction over the side of the sheet 10. At the opposite side of the sheet are a pair of pinch rolls 8 and 9 which are suitably driven to advance the fastener strip 15 laterally over the side of the material 10. The strips are advanced until they are adjacent the center 13, but a space at 14*d* may be left between the ends of the strips to accommodate folding of the sheet 10 about its longitudinal center 13 and to permit providing a spot heat seal at the ends of the strips 14 and 15. Also spaces at 14*e* and 15*d* may be left at the ends of the strips, i.e., between the ends and the edges of the film.

The strips are advanced to the position shown in FIG. 1 with a space therebetween and cutters are brought down to sever the strips to the desired length. The cutters are shown in the form of knives 28 and 30 which are lowered to perform their severing operation by supporting the piston and cylinder assemblies 27 and 29 carried on the frame 26. The knives have sharpened edges so that when they are brought down, they sever the material.

For guiding the material as it is thrust laterally across the top surface of the sheet 10, fixed outer downwardly facing channels 19 and 20 are positioned at either end. These channels are shaped to accommodate the rib, for the channel 19 and the groove for the channel 20, with the latter generally as shown in the end view of FIG. 2. The fixed channels have a center continuation channel 18 which is shaped on one side, up to its center point, so as to accommodate the fastener rib and on the other side of the center point so as to accommodate the fastener groove and has a front gate 21 which when lowered completes the channel groove, but which when raised releases the fastener strips by then attached to the film so that they can be moved forwardly as the sheet 10 is advanced. The center portion and end portions of the channels are suspended on vertical posts depending from the frame 26. The channel 18 has a rear fixed portion 36 which remains in place while the front gate 21 is supported on hinges 22 and 23. The gate is lifted to permit the fastener strips to be slid forwardly with movement of the sheet 10 by a bracket 25 attached to the gate 21 and which is operated by a piston rod 24 and a cylinder 30 supported on 31 on suitable brackets on the frame 26.

When the fastener strips are driven across on top of the sheet 10, the rear and forward part 36 and 21 respectively of the center channel portion 18 are positioned as shown in FIGS. 1 and 2. After the strips have been driven across and cut, a vertical reciprocal heat sealing shoe 31 moves upwardly. The shoe has a center groove 32 so that heat is not applied to the rib 14*a* or the groove 15*a* portion of the strips but heat is applied to the film directly opposite the webs 14*b* and 14*c*, and the webs 15*b* and 15*c*. A suitable heating element, not shown, within the shoe 31 provides heat and the shoe is brought up into contact with the film long enough to seal the fastener strips to the film. Alternately, a shoe with a single centrally positioned wire that seals the base sections of the fastener directly under the rib and groove elements, to the film, can be used. The shoe is then dropped, and the forward gate 21 is lifted, and the film 10 then is moved forwardly as indicated by the arrowed line in FIG. 1. The forward gate is then returned to its closed position. The strips, thus attached, move forwardly as shown in FIG. 1 and a new set of strips is placed on the sheet with the strips being attached at predetermined longitudinally spaced intervals. The fastener can either be cut to the same width as the film, or to a slightly shorter width. In the latter case, small base plates 34 are provided that ride between the film and the fastener so as to prevent cutting of the film at that location. Whichever arrangement is used, the sealing bars will have the same width as the cut fastener section.

Subsequently the sheet is folded down its center 13 with the rib and groove members interlocked in the manner that will be explained below in connection with FIGS. 8 and 9.

FIGS. 3 through 7 illustrate the method and apparatus adapted for a different form of fastener strip wherein the strip portions from both sides of the film are identical in construction. The strip as shown at 41 in FIG. 3 has a plurality of ribs 41*c* thereon with grooves 41*d* therebetween. With this form of fastener strip, a complementary strip having the identical construction has ribs which will enter the grooves 41*d*, but the strips must be slightly laterally offset from each other so that the ribs of the other strip will confront the grooves. The strips have webs 41*a* and 41*b* at the sides for attaching the strips to the film 10.

Figure 4:
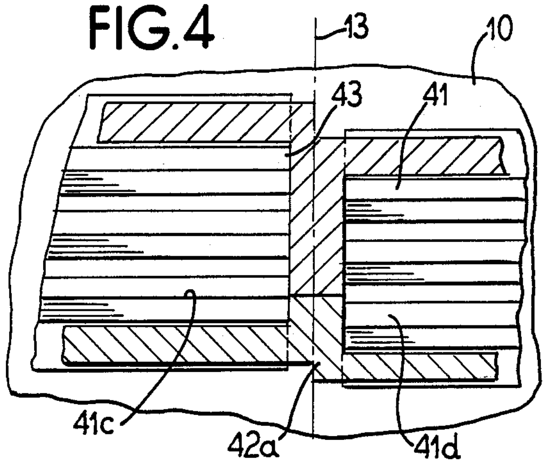
FIG. 4 is a fragmentary plan view of the center of the film at the ends of the fastener strips.

As shown in FIG. 4, two strips are brought in from opposite lateral sides of the film 10 in the manner which was described in connection with FIG. 1. A space may be left between the inner ends of the film as shown in FIGS. 1 and 4. The channels which guide the film are slightly offset as indicated at 42*a* so that ribs 41*c* are opposite grooves 41*d*. With this relationship of the strips when the film is folded upon itself along the centerline 13, the ribs will enter the grooves for the strips to interlock.

Figure 5:
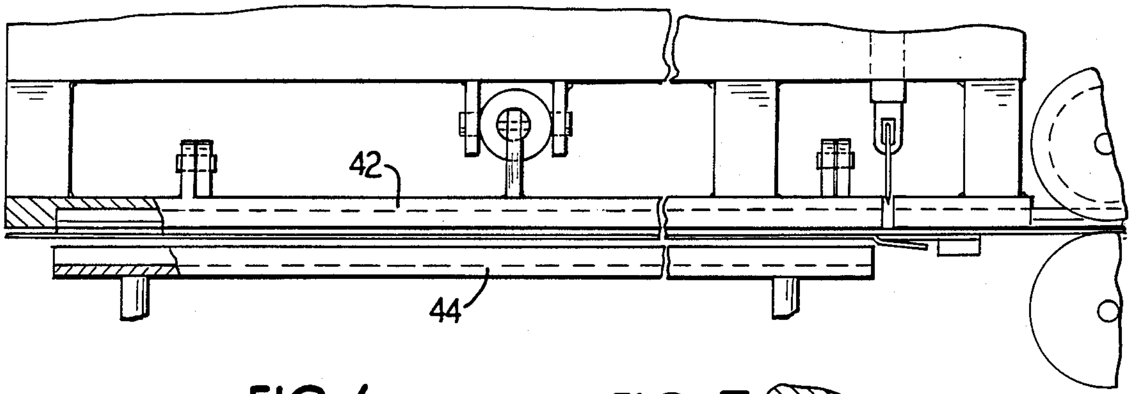
FIG. 5 is a fragmentary vertical view showing means for attaching the fastener strips to the film.
Figure 6:
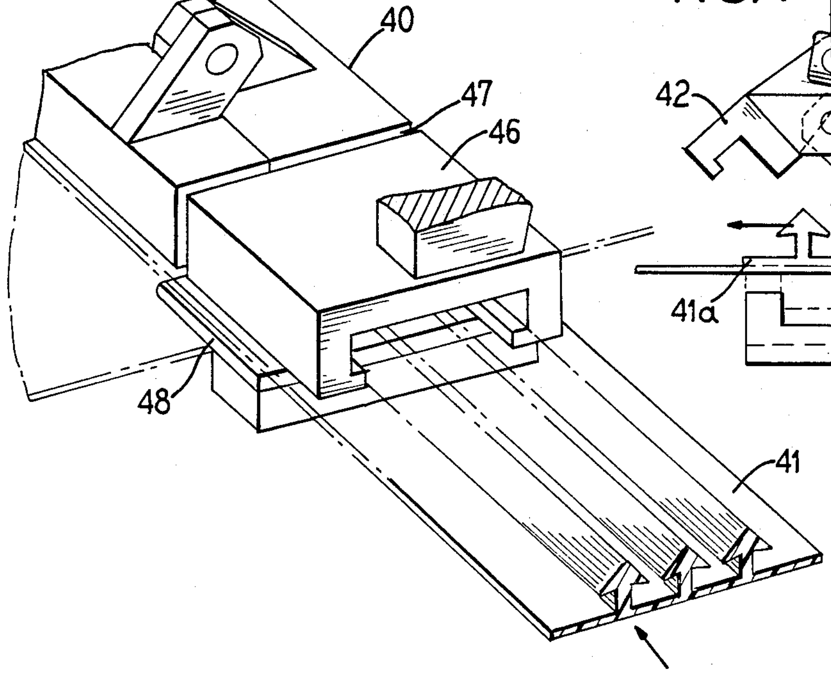
FIG. 6 is a fragmentary enlarged perspective view illustrating mechanism for guiding the strips onto the film.
Figure 7:
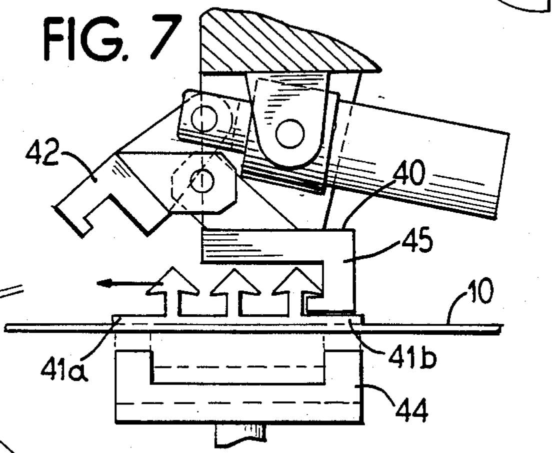
FIG. 7 is a fragmentary end elevational view illustrating mechanism for permitting the film to be advanced.

FIGS. 5, 6 and 7 indicate the guide arrangements for guiding the strips into place. A fixed channel 46 is positioned at the lateral edge of the film and as the strip 41 is driven laterally across the film, it also slides into the center portion 40 of the channel. The center portion has a hinged front gate 42 which is in its lowered position, as shown in FIGS. 5 and 6, when the fastener strip is driven into place, and which is raised to its raised position as shown in FIG. 7 when the film 10 with the attached fastener 41 is advanced in the direction indicated by the arrowed line in FIG. 7.

A heated sealing shoe 44 is brought up beneath the film to seal the flanges 41*a* and 41*b* of the strip to the upper surface of the film, or to seal the base area of the fastener.

Figure 8:
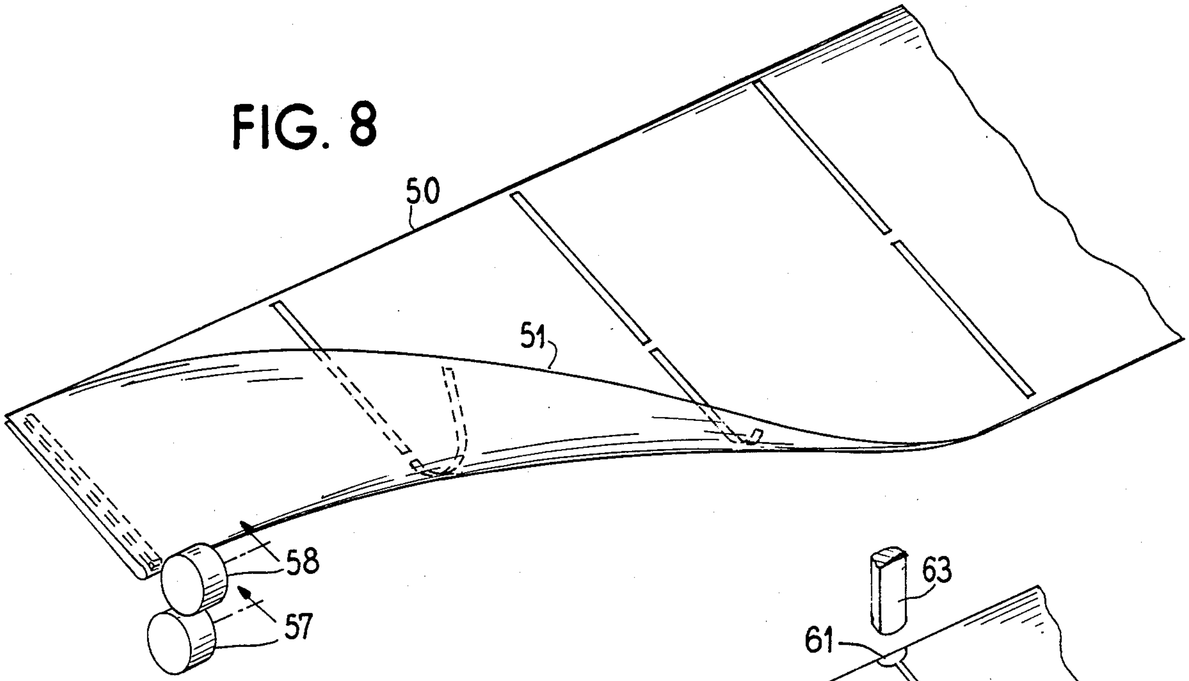
FIG. 8 is a fragmentary perspective view illustrating a further step in the folding of the film such as may occur in a form, fill and seal machine.
Figure 9:
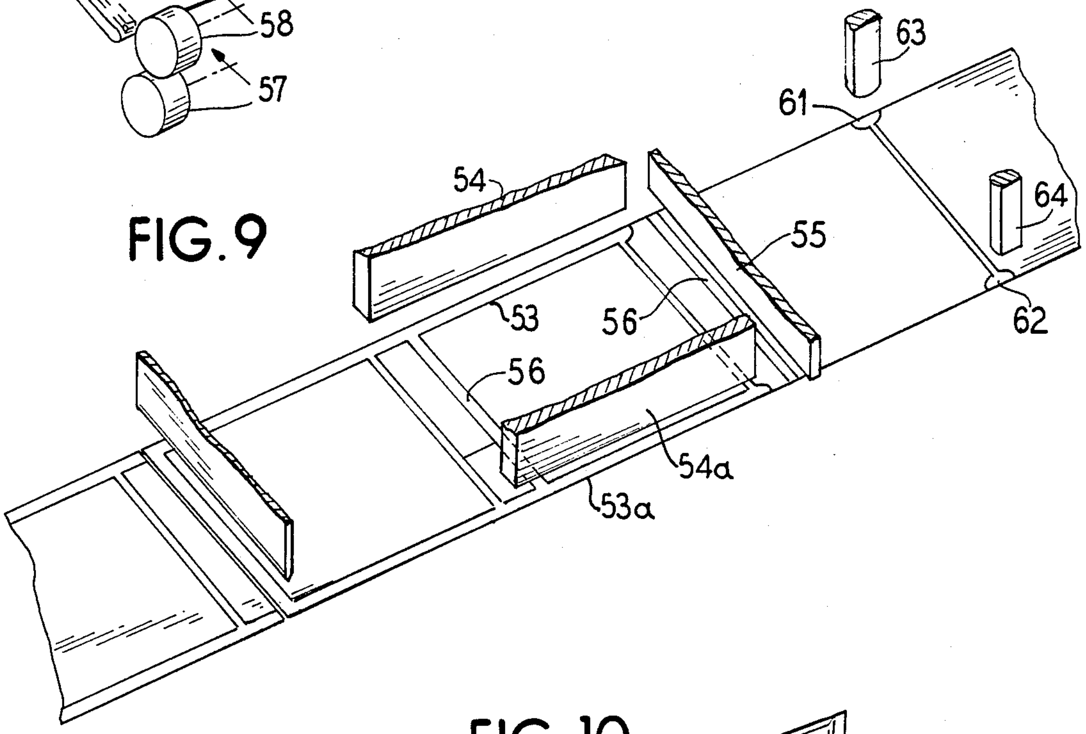
FIG. 9 is a fragmentary perspective view illustrating forming seams at each side of the film.
Figure 10:
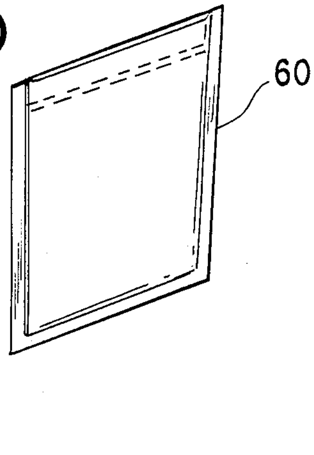
FIG. 10 is a perspective view of a finished bag.

The film thus formed is ready for processing through a form, fill and seal machine or is suited for the manufacture of bags and at that point may be rolled onto a roll or may be first folded upon itself in the manner indicated in FIG. 8, for subsequent manufacture into empty bags.

In FIG. 8 the film is folded down its longitudinal center parallel to its longitudinal formation axis so that the edges 50 and 51 are brought together. FIGS. 8 and 9 illustrate one form of utilization of the film which has now had the fasteners attached. The features of the invention find principal use in the preparation of material for a form, fill and seal operation. In such operation, the film is fed forwardly intermittently, wrapped around a mandril where contents are placed in the wrapped film, and the edges that are brought together from the wrapping are sealed to each other so that a tube is formed. Thereafter, a cross seal is formed behind the contents and forming the bottom of the next bag to hold the next charge of contents. The fasteners are in a location so that there will be a reclosable fastener at the top of each of the bags. After the bags have been handled so that their side seam is formed, and they are filled, they are cut off so that individual bags are provided each filled in the operation. FIG. 9 illustrates an alternative way of utilizing the continuous strip of material which has had the fastener strips attached. As illustrated in FIG. 9, the edges are sealed to each other to form a side seam 53 for the bag by bringing a heated bar 54 against the aligned edges. To maintain uniformity of appearance a side seam 53*a* is formed, on the folded film, opposite seam 53 by another heated bar 54*a*. Pressure rollers 57 and 58 are moved across the bag to join the interlocking rib and groove members. Alternately, upper and lower pressure bars can be used. Spot seals 61 and 62 are formed at the ends of the strips locking them in their relative positions so that the ribs and grooves remain aligned. The spot seals are formed by bringing heated spot seal members 63 and 64 down onto the material at the ends. A cross-seam 56 is formed by a heat seal bar 55 with the cross-seams being formed at spaced intervals to be spaced from the fastener strips 52 to form a bag.

This completes a finished bag as illustrated at 60. The bag 60 is completed when individual bags are cut from the length of material formed in the manner above described.

Thus, it will be seen that there has been provided an improved method and mechanism for making material for a bag wherein fastener strips extend laterally across the material. The material and the mechanism meet the objects and advantages above set forth and provide an improved arrangement for rapid and effective forming of bag material.

We claim as our invention:

1. A mechanism for making material suitable for use in a form, fill and seal operation comprising in combination:

means for advancing a continuous sheet of thin plastic film material along a path including a fastener station therealong;

means for supplying a first supply of flexible fastener strip material at one side of the sheet;

means for supplying a second supply of flexible fastener strip material to the opposite side of the sheet;

first guide means positioned at said station aligned with said first supply for guiding the first strip material laterally onto the sheet;

second guide means positioned at said station aligned with said second supply of strip material for guiding the second strip material laterally onto said sheets positioned in alignment with said first supply of first strip material;

means for securing said first and second strips to the film sheet;

said first and second guide means includes open channels facing downwardly toward the film through which the flexible strip material slides; and including a movable wall along the forward side of the channels movable to a noninterfering position to allow exit of the fastener strip material from the channels when the film sheet is moved forwardly along the path after the strip material has been attached thereto.

2. A mechanism for making material suitable for use in a form, fill and seal operation constructed in accordance with claim 1:

wherein said first and second strip material is thermoplastic and the mechanism includes a hot shoe with means for moving the shoe upwardly beneath the film opposite the location of said first and second fastener strip material for heat sealing the material to the sheet of film.

3. A mechanism for making material suitable for use in a form, fill and seal operation constructed in accordance with claim 1:

including a cutter means for severing said first and second supply of strip material at the edge of the sheet of thin plastic material.

4. A mechanism for making material suitable for use in a form, fill and seal operation constructed in accordance with claim 1:

wherein said first and second supply of fastener strip material is identical and includes a plurality of ribs and grooves and said second guide means is slightly offset from the first so that the ribs of one strip will be aligned with grooves of the other strip.

* * * * *